United States Patent [19]

Bigauskas

[11] Patent Number: 5,366,714
[45] Date of Patent: Nov. 22, 1994

[54] HYDROGEN PEROXIDE-BASED CHLORINE DIOXIDE PROCESS

[75] Inventor: Tomas D. Bigauskas, Mississauga, Canada

[73] Assignee: Sterling Canada Inc., Islington, Canada

[21] Appl. No.: 895,675

[22] Filed: Jun. 9, 1992

[51] Int. Cl.⁵ .............................................. C01B 11/02
[52] U.S. Cl. ..................................... 423/478; 423/477
[58] Field of Search ................................ 423/477, 478

[56] References Cited

U.S. PATENT DOCUMENTS

| | | | |
|---|---|---|---|
| 2,833,624 | 5/1958 | Sprauer | 23/152 |
| 4,105,751 | 8/1978 | Caillol | 423/478 |
| 4,206,193 | 6/1980 | Partridge et al. | 423/478 |
| 4,325,934 | 4/1982 | Swindells et al. | 423/478 |
| 4,421,730 | 12/1983 | Isa et al. | 423/478 |
| 4,465,658 | 8/1984 | Fredette | 423/478 |
| 4,534,952 | 8/1985 | Rapson et al. | 423/477 |
| 5,066,477 | 11/1991 | Zell et al. | 423/479 |
| 5,091,166 | 2/1992 | Engstrom et al. | 423/478 |
| 5,091,167 | 2/1992 | Engstrom et al. | 423/478 |

*Primary Examiner*—Benjamin R. Fuller
*Assistant Examiner*—Valerie Ann Lund
*Attorney, Agent, or Firm*—Sim & McBurney

[57] ABSTRACT

Chlorine dioxide is continuously produced at high efficiency in a single vessel process by reduction of chlorate ions with hydrogen peroxide in an aqueous acidic medium. The hydrogen peroxide is pre-mixed with at least a portion of the aqueous chlorate solution feed or the sulfuric acid feed or a mixture thereof. By pre-mixing the hydrogen peroxide feed, the occasional decomposition of hydrogen peroxide and the resulting foaming of the generator liquor is eliminated.

26 Claims, No Drawings

HYDROGEN PEROXIDE-BASED CHLORINE DIOXIDE PROCESS

FIELD OF THE INVENTION

The present invention is concerned with the production of chlorine dioxide using hydrogen peroxide as the reducing agent, and in particular to the production of chlorine dioxide where the hydrogen peroxide is premixed with the other reagents prior to being fed into the generator.

BACKGROUND OF THE INVENTION

It is known to produce chlorine dioxide by reduction of an acid aqueous chlorate solution using various reducing agents such as methanol, chloride ions, hydrogen peroxide, etc. In U.S. Pat. No. 2,833,624 (Sprauer), a process is described whereby chlorine dioxide is produced by reacting chlorate ions, a strong acid and hydrogen peroxide. The process can be carried out in the presence of chloride ions, which are said to catalyze the reaction. U.S. Pat. No. 2,833,624, however, does not teach carrying out the process in a single vessel under subatmospheric pressure.

U.S. Pat. No. 4,421,730 (Isa et al) also discloses a process to produce chlorine dioxide using hydrogen peroxide. This process, however, requires the reduction to be effected using chloride ions in the presence of a complex palladium (II) catalyst and the hydrogen peroxide in order to achieve commercially attractive production rates.

Recently, there issued U.S. Pat. Nos. 5,091,166 (Engstrom et al) and 5,091,167 (Engstrom et al) wherein chlorine dioxide is described as being produced in a single-vessel generator-evaporator-crystallizer process using hydrogen peroxide as the reducing agent. Hydrogen peroxide for use in the process generally is employed in its commercially-available form, generally an aqueous solution containing about 30 wt % hydrogen peroxide or higher. Alkali metal chlorate, hydrogen peroxide and sulfuric acid are continuously fed to the generator. Commercially acceptable production rates and efficiencies are said to be obtained. The main distinction between both processes is that U.S. Pat. No. 5,091,166 covers the acidity range 2 to 5N whereas U.S. Pat. No. 5,091,167 covers the acidity range 5 to 11N.

The operation of a hydrogen peroxide-based chlorine dioxide generator using one of the processes described in U.S. Pat. Nos. 5,091,166 and 5,091,167 generally leads to satisfactory results in terms of the chemical yield of chlorine dioxide on chlorate. These processes, however, have certain deficiencies and disadvantages which can seriously affect the operation of the generator. For example, there can occasionally be an excessive consumption of hydrogen peroxide, leading to inefficient operation. Also there can be excessive foaming of the liquor in the generator, potentially leading to unsafe operation and uneven production rates of chlorine dioxide. Additionally, the process can have high sensitivity to metallic impurities (such as iron) inadvertently but often present in variable and uncontrollable amounts in the liquor, there can be occasional variations in the purity of the product, there is enhanced corrosion of the equipment, etc. In other words, continuous operation of the processes in U.S. Pat. Nos. 5,091,166 and 5,091,167 can, on occasion, become highly inefficient and unpredictably unstable, leading to potentially unsafe operation.

SUMMARY OF THE INVENTION

It has been surprisingly found that the deficiencies of the processes disclosed in U.S. Pat. Nos. 5,091,166 and 5,091,167 in employing hydrogen peroxide feed solutions having concentrations of at least about 30 wt % and hence prone to result in localized concentrations of hydrogen peroxide in the generator liquor and greater than the stoichiometric consumption of hydrogen peroxide, can be obviated or mitigated by diluting the hydrogen peroxide to a lower concentration, by diluting with water or, preferably, pre-mixing the hydrogen peroxide with at least a portion of one or more of the aqueous chlorate solution or sulfuric acid prior to feeding the same into the chlorine dioxide generator.

It is generally believed that the reactions involved in the production of chlorine dioxide in a hydrogen peroxide-based process can be represented as follows:

$$2ClO_3^- + 2Cl^- + 4H^+ \rightarrow 2ClO_2 + Cl_2 + 2H_2O \quad (1)$$

$$Cl_2 + H_2O_2 \rightarrow 2Cl^- + O_2 + 2H^+ \quad (2)$$

The overall reaction can be summarized as:

$$2ClO_3^- + H_2O_2 + 2H^+ \rightarrow 2ClO_2 + 2H_2O + O_2$$

Therefore, the role of the hydrogen peroxide in reaction (2) is to reduce the chlorine gas formed in reaction (1) back to chloride ions for use in reaction (1). The sources of chlorate ions useful in the process of this invention are varied and can include alkali metal chlorate salts as well as chloric acid and mixtures.

Hydrogen peroxide, however, is a relatively unstable compound that readily undergoes the following decomposition reaction:

$$2H_2O_2 \rightarrow 2H_2O + O_2 \quad (3)$$

This reaction is known to be catalyzed by various metallic impurities, in particular iron, which is typically present in the generator liquor in variable and unpredictable amounts. Also, in a chlorine dioxide generator, the potential for decomposition of hydrogen peroxide is thought to be dependent on the local concentration of hydrogen peroxide, so that the decomposition reaction occurs more readily with higher local concentrations. Finally, the rate of the decomposition reaction is increased because of the elevated temperatures generally employed in the generator.

Therefore, it is believed that, by initially diluting the normally relatively higher concentration hydrogen peroxide solution, the high local concentrations that are present if the hydrogen peroxide is fed directly into the generator are eliminated. As a result, the potential for decomposition of hydrogen peroxide is decreased. Furthermore, such dilution, which preferably is effected by pre-mixing the hydrogen peroxide with other reagents fed to the reaction medium, also minimizes the other deficiencies of the processes in U.S. Pat. Nos. 5,091,166 and 5,091,167 noted above.

It is also believed that the decomposition of hydrogen peroxide leads to increased foaming in the generator because of the oxygen gas that is formed. Foaming can be very problematic as it can result in the generator liquor becoming entrained into the off gas product line.

This entrainment leads to the loss of valuable reagents, particularly chlorate, and may also cause pH control problems at the bleaching plant since the chlorine dioxide liquor is acidified. Furthermore, the entrained liquor can freeze in the gas cooler/condenser, resulting in blocked tubes and a production shut down.

Accordingly, the present invention provides an improvement in a process for the production of chlorine dioxide by the reduction of chlorate ions with hydrogen peroxide in an aqueous acid reaction medium maintained at its boiling point under a subatmospheric pressure. The improvement comprises feeding the hydrogen peroxide to the reaction medium such that hydrogen peroxide is consumed at its rate of feed to the reaction medium and there is no detectable concentration of hydrogen peroxide within the reaction medium.

GENERAL DESCRIPTION OF INVENTION

In the present invention, chlorine dioxide is produced from aqueous chlorate, a strong mineral acid and hydrogen peroxide in a boiling reaction medium while a subatmospheric pressure is applied to the generator containing the reaction medium. The off-gas product stream resulting from the process of the present invention is a mixture of steam, oxygen gas and chlorine dioxide. This product stream is continuously removed from the generator and is cooled and condensed to form an aqueous solution of chlorine dioxide for use in a pulp bleaching process, or other desired use.

Chlorine dioxide can be produced in commercially significant quantities according to the invention using a single vessel generator-evaporator-crystallizer process operating at subatmospheric pressure and using hydrogen peroxide as the reducing agent. The process can be run at an acid normality ranging from about 0.1 to about 11N and may be operated without the aid of catalysts. However, one or more production rate-enhancing catalysts may be used, if desired, as discussed below. The resulting product stream is essentially chlorine-free, which is considered to be highly desirable since it is more environmentally friendly. The resultant production rates and efficiencies of chlorine dioxide generation are very high.

As can be seen from the reactions (1) and (2) above, for chlorine dioxide generation, ideally two moles of chlorate ions react with one mole of hydrogen peroxide. According to the process of the present invention, hydrogen peroxide is fed in such a manner that no excess amounts of hydrogen peroxide are present throughout the reaction medium in the generator, and hence it is preferable to have excess chlorate ions in the reaction medium. Accordingly, at the relatively lower acidities of below about 5N, the chlorate ion concentration in the reaction medium can vary from about 2M up to saturation, preferably about 3 to about 4M. At higher acidities above about 5N, lower concentrations of chlorate ions may be employed, down to about 0.2M. Chlorate ions may be provided by an alkali metal chlorate, usually sodium chlorate, although chloric acid and mixtures of sodium chlorate and chloric acid may be used. Where chloric acid is employed as a source of chlorate ions, the chloric acid also provides a source of hydrogen ions for the process. Accordingly, in one preferred aspect of the invention, chlorine dioxide is produced from chloric acid and hydrogen peroxide.

As discussed above, the production of chlorine dioxide using hydrogen peroxide to reduce chlorate ions in an aqueous acidic reaction medium involves two interrelated chemical reactions. In addition, there is a third competing reaction involving the decomposition of hydrogen peroxide. In order for the hydrogen peroxide-based chlorine dioxide process to make efficient use of hydrogen peroxide, the competing decomposition reaction must be minimized as much as possible. If that result is achieved, then the theoretical stoichiometric consumption ratio of one mole of hydrogen peroxide per two moles of chlorate ions is approached, and valuable hydrogen peroxide is not wasted. Furthermore, minimizing the decomposition reaction and eliminating localized excesses of hydrogen peroxide aids in reducing or eliminating the other deficiencies described above. The third reaction is minimized herein by providing the hydrogen peroxide in a dilute form when fed to the reaction medium.

In the process of the present invention, aqueous chlorate solution is reduced with hydrogen peroxide in the presence of a strong mineral acid, preferably sulfuric acid but which also may comprise other mineral acids as well as mixtures thereof, including nitric acid, hydrochloric acid, perchloric acid or chloric acid, at total acid normality between about 2 and 11N, preferably in the ranges from about 2 to 5N or from about 5 to 11N. In the absence of sulfate ions, for example, in the case of chloric acid, the lower acidity limit is about 0.5N while for hydrochloric acid, the lower limit is even lower, about 0.1N. For chloric acid, the upper limit of acid normality is about 5N.

The hydrogen peroxide may be pre-mixed, prior to feeding into the reaction medium, with at least a portion of either or both of the aqueous chlorate solution or the strong mineral acid feeds or mixtures thereof, so as to dilute the commercially-available high hydrogen peroxide concentration solution to a much lower concentration, so as to minimize the likelihood of any localized high concentrations in the reaction medium.

Dilution of the hydrogen peroxide also can be accomplished by initial dilution of high concentrations of hydrogen peroxide, for example 30 wt % and above (such as 35, 50 or 70 wt % hydrogen peroxide) with water to a lower concentration, for example, 10 wt %, which permits the hydrogen peroxide to be uniformly distributed in the reaction medium. However, excessive amounts of water in the generator impose an additional evaporative loading requiring larger equipment and higher steam flows to maintain the reaction medium at its boiling point. Accordingly, pre-mixing of the hydrogen peroxide with at least a portion of the other reagents is preferred in the present invention over dilution with water.

The possibility of pre-mixing hydrogen peroxide with the other reagents prior to feeding it to the chlorine dioxide generator has been mentioned in U.S. Pat. No. 2,833,624 as a convenient method of operating an older type chlorine dioxide generator based on the reaction occurring at atmospheric pressure. However, in that prior art, no criticality is asserted for pre-mixing hydrogen peroxide with the other reagents. That is, it was not shown that benefits, such as minimization of the decomposition of hydrogen peroxide and minimization of foaming, could be obtained in a single vessel generator-evaporator-crystallizer chlorine dioxide generating reaction. In fact, in the older type generators, as disclosed in U.S. Pat. No. 2,833,624, foaming was likely not a problem at all since the reaction occurred at atmospheric pressure and the generators were air sparged to remove product chlorine dioxide, whereas foaming is a problem generally associated with generators operating at subatmospheric pressures.

The reason for the beneficial effects provided by diluting the hydrogen peroxide by pre-mixing with the other reagents in accordance with the present invention is not completely understood. While we do not wish to be held to a theory of action of the invention, it is believed, however, that the observed minimization of the deficiencies noted above can be attributed to the elimination of the local, momentary excesses of hydrogen peroxide in the generator. As a result, hydrogen peroxide is consumed at its rate of feed to the reaction medium and there is no detectable concentration of hydrogen peroxide within the reaction medium. If the hydrogen peroxide, at concentrations of 30% or more as described in the Examples of U.S. Pat. No. 5,091,166, is fed directly into the generator, there will be a lapse of time before the hydrogen peroxide is homogeneously diluted in the liquor. This localized, high concentration of hydrogen peroxide is believed to potentially lead to the various deficiencies listed above.

As was stated earlier, hydrogen peroxide is a relatively unstable compound that readily undergoes a decomposition reaction to form water and oxygen gas. The decomposition occurs more readily if the concentration of hydrogen peroxide is increased and an elevated temperature environment exists. Furthermore, this decomposition reaction is catalyzed by metal impurities, particularly iron, which are typically present in the generator liquor in variable and uncontrollable quantities. The sources of these iron impurities include the concentrated sulfuric acid feed and the corrosion of steel in the feed lines to the generator. Accordingly, by decreasing and eliminating the localized excesses of hydrogen peroxide in the generator, it is believed that the decomposition reaction is also minimized.

One of the results of the decomposition of hydrogen peroxide according to reaction (3) is that excessive hydrogen peroxide is consumed. As an illustration, the consumption of hydrogen peroxide per mole of reacted chlorate ions was calculated for each of Examples 1, 2 and 3 in U.S. Pat. No. 5,091,166. In Examples 1 and 3, the molar ratios of consumed hydrogen peroxide to chlorate ions was very close to the theoretical value of 1:2, therefore indicating efficient consumption of hydrogen peroxide. In Example 2, however, the reported data shows that 7% of the consumed hydrogen peroxide did not react with the chlorate ions. In other words, 7% of the hydrogen peroxide was used inefficiently. This variation in efficiency does not appear to be related to the reported yields on chlorate, since the yield for Example 1 was slightly higher than Example 2, but the yield of Example 3 was substantially less than Example 2. One explanation for this inefficiency is that, in the experiment of Example 2, there were localized high concentrations of hydrogen peroxide in the generator, which resulted in the decomposition of hydrogen peroxide.

The decomposition of hydrogen peroxide creates several important disadvantages. Firstly, as was mentioned above, valuable hydrogen peroxide is used up inefficiently, and in commercial processes, this can lead to substantial additional costs. Secondly, the decomposition reaction generates excess oxygen gas, which occasionally can result in significant foaming of the liquor in the generator. Although foaming may not have been a problem in the older-type generators operated at atmospheric pressure, it can be very significant in generators operating at subatmospheric pressures. Foaming of the liquor can result in entrainment of the liquor into the product streams and in uneven production of chlorine dioxide. Foaming can also lead to potentially unsafe operation of the generator resulting in its shut down. Furthermore, it has been found that when significant foaming occurs, it can persist for an extended period, typically almost one hour after the hydrogen peroxide feed is stopped, thereby resulting in an important loss of production. It has been found that the possibility of foaming occurring can be minimized and eliminated by diluting normally relatively high concentration hydrogen peroxide solutions to lower concentrations, such as by pre-mixing the hydrogen peroxide with a portion of the other reagents prior to feeding in the generator.

Pre-mixing of the higher concentration hydrogen peroxide solution with other reagents, so as to produce a lower concentration feed, below about 15 wt % hydrogen peroxide, resulting in the elimination of localized excesses of hydrogen peroxide in the reaction medium in the chlorine dioxide generator, also aids in minimizing corrosion of the equipment, in particular corrosion of the generator. Typically, single vessel process type generators are constructed with titanium-based alloys. It is known that hydrogen peroxide is corrosive with regards to titanium. Accordingly, minimizing and eliminating localized excesses of hydrogen peroxide herein results in a decrease of corrosion in the generator.

In accordance with a preferred embodiment of this invention, the hydrogen peroxide feed to the chlorine dioxide generator is pre-mixed with at least a portion of either or both of the aqueous chlorate solution or the strong mineral acid or mixtures thereof. Where chloric acid is used to provide both chlorate ions and hydrogen ions for the process, the hydrogen peroxide is premixed with the chloric acid solution. The pre-mixing is preferably effected in such a way that the localized concentration of hydrogen peroxide anywhere in the generator does not exceed the stoichiometric requirements of the chlorine dioxide generating reaction. In accordance with the present invention, hydrogen peroxide is consumed as soon as it is fed to the reaction medium, so that there is no measurable concentration of hydrogen peroxide in the chlorine dioxide generator.

It has further been found that it is not important how the hydrogen peroxide is actually pre-mixed with the other reagents, or otherwise diluted. For example, the hydrogen peroxide can be pre-mixed by feeding it into either one or both of the aqueous chlorate solution feed line or the strong mineral acid feed line. The mixed reagents are then fed to the generator. Alternatively, the pre-mixing can be done in a separate mixing vessel, and then the mixed reagents are fed to the chlorine dioxide generator. Additionally, it is also possible to pre-mix the hydrogen peroxide internally in the generator prior to chlorine dioxide generation using a single vessel process generator equipped with a modification similar to that described in U.S. Pat. No. 5,066,477, assigned to the assignee hereof and the disclosure of which is incorporated herein by reference.

The chlorine dioxide generator used in the present invention is a single vessel generator-evaporator-crystallizer, which permits chlorine dioxide generation, evaporation of water and crystallization of by-product salts, if any, to occur within the same reaction zone. Such reactors are well known in the commercial production of chlorine dioxide. The reactants are continuously fed to the generator, to provide a chlorine dioxide-generating aqueous acid reaction medium solution containing chlorate ions, strong mineral acid and hydrogen peroxide. The generator is operated at sub-atmospheric pressure, generally at between about 50 and about 400 mmHg, preferably between about 100 and about 300 mmHg, and most preferably between about 120 and about 200 mmHg. The temperature of the reaction medium in the generator is generally between about 50° C. and about 90° C., preferably between about 65° C. and about 80° C., so as to maintain the reaction medium at its boiling point under the prevailing subatmospheric pressure conditions.

The source of chlorate ions employed in the process of the present invention usually is sodium chlorate, but other alkali metal chlorates can be used. If sodium chlorate is used, the sodium ions combine with the cationic species from the strong mineral acid, for example, sulfuric acid, to form by-product sodium salt. The concentration of sodium sulfate builds up in the generator on start up, until it saturates and crystallizes. The form of the sodium sulfate precipitated depends on the total acid normality of the reaction medium, and may comprise neutral sodium sulfate at the lower acid normalities and sodium sesquisulfate at the higher acid normalities. The sodium sulfate is removed from the generator in crystalline form in a conventional way. Where the sodium sulphate removed from the generator is in the form of an acid sulfate, such as sodium sesquisulphate, such material may be converted to the neutral salt and the acid values recovered by metathesis, as described in U.S. Pat. No. 5,116,595, assigned to the assignee hereof and the disclosure of which is incorporated herein by reference.

As noted above, the chlorate may be provided by chloric acid, which then also provides the acid requirement for the process. In such a process, there is no by-product salt produced, although the process usually is effected in the presence of a dead-load of sodium chlorate, in analogous manner as described in co-pending U.S. patent application Ser. No. 837,887 filed Feb. 20, 1992 for methanol as the reducing agent, assigned to the applicant herein and the disclosure of which is incorporated herein by reference.

Although the process of the present invention can be operated efficiently without the addition of chloride ions or of a catalyst, some chloride ions or some catalytically active ions can be added if appropriate. Chloride ion addition may be desirable at high acid normalities of operation to inhibit the creation of a potential "white-out" condition, as described in U.S. Pat. No. 4,465,658 for methanol as the reducing agent, assigned to the assignee hereof and the disclosure of which is incorporated herein by reference. Catalytically-active ions may be desirable at lower acid normalities, particularly to enhance production rates when diluted hydrogen peroxide solution of concentration less than about 15 wt % hydrogen peroxide, preferably about 10 wt % hydrogen peroxide or below, is used as the feed for the reaction medium. Examples of typical catalytic ions which may be employed include Ag, Mn, V, Mo, Pd and Pt.

EXAMPLES

The following experiments were performed in a laboratory-sized chlorine dioxide generator wherein the reaction medium was maintained at its boiling point at approximately 70° C. with an appropriate subatmospheric pressure applied thereto and producing approximately 2 to 4 g chlorine dioxide per minute. The chlorine dioxide production rate was continuously monitored by noting the reading on a chlorine dioxide solution analyzer attached to the outlet line of the chlorine dioxide gas absorber. The hydrogen peroxide feed was carefully controlled using peristallic-type pumps and was monitored by feeding from a 1 liter burette with 10 milliliter graduations. Burette readings were taken every 10 minutes. Thus, the feed rate of hydrogen peroxide was carefully compared to the production rate of chlorine dioxide. In all cases, the chlorine concentration in the product solution was virtually undetectable and the chlorine dioxide yield on chlorate was above 98% for all examples. Feeds of reactants were maintained at the rates appropriate to maintain the recited reaction medium conditions throughout the experiments.

Example 1

The generator was run at a liquor acidity of 4.4 to 4.8N and chlorate concentration of 4.8 to 5.0M while feeding a solution having the following composition: 515 g/l sodium chlorate, 85 g/l hydrogen peroxide, 4 g/l 18N sulfuric acid and 2 g/l sodium chloride (i.e. a feed solution in which the hydrogen peroxide is prediluted by mixture with other reactants). (The sodium chloride was present as a result of impurity in the sodium chlorate employed to form the feed solution in all Examples). 30N sulfuric acid was fed to maintain the acid normality level. From a mass balance over a 57 minute time period, the hydrogen peroxide consumption rate was calculated to be 0.252 tons $H_2O_2$ per ton $ClO_2$ produced, while the chlorine dioxide production rate was 3.6 g/min.

Example 2

The generator was run at a liquor acidity of 3.5 to 4.2N and chlorate concentration of 4.0 to 4.5M while separately feeding (a) a 10 wt % hydrogen peroxide solution (i.e. hydrogen peroxide solution pre-diluted with water), (b) a 6.0M sodium chlorate solution containing 0.5M sodium chloride and (c) 30N sulphuric acid. From a mass balance over a 337 minute period, the hydrogen peroxide consumption rate was 0.26 tons $H_2O_2$ per ton $ClO_2$ produced and the production rate of chlorine dioxide was 2.3 g/min.

Example 3

The generator was run at a liquor acidity of 4.3 to 4.6N and chlorate concentration 4.0 to 4.2M, with 35 ppm silver in the liquor, while separately feeding (a) a 10 wt. % hydrogen peroxide solution (i.e. hydrogen peroxide solution pre-diluted with water), (b) a 6.0M sodium chlorate solution containing 0.01M sodium chloride and (c) 30N sulphuric acid. From a mass balance over a 35 minute period, the hydrogen peroxide consumption rate was 0.28 tons $H_2O_2$ per ton $ClO_2$ produced and the chlorine dioxide production rate was 2.9 g/min.

Example 4

The generator was run with a liquor of the same composition as that of Example 3, while separately feeding (a) a 30 wt. % hydrogen peroxide solution (i.e. an undiluted hydrogen peroxide solution), (b) a 6.0M sodium chlorate solution containing 0.01M sodium chloride, and (c) 30N sulphuric acid. The generator could only be run for no more than 15 minutes as the foaming that was produced caused operating difficulties. From a mass balance over the 15 minute period, the hydrogen peroxide consumption rate was 0.31 tons $H_2O_2$ per ton $ClO_2$ produced and the chlorine dioxide production rate was 2.54 g/min.

From the data presented in these Examples, the following conclusions may be drawn with respect to generation of chlorine dioxide using hydrogen peroxide under the recited conditions:

a) The presence of catalyst (35 ppm Ag) improves chlorine dioxide production rate in the case of separate feeds, and the improvement is more significant in the case of a 10% hydrogen peroxide feed than in the case of a 30% hydrogen peroxide feed (Examples 3 and 4).

b) The lowest hydrogen peroxide consumption rate and the highest chlorine dioxide production rate were achieved by feeding premixed solution, and did not require the use of a catalyst (Examples 1 and 2).

c) Under almost identical conditions, the weaker hydrogen peroxide solution (10%) allowed lower consumption and higher production rates than the stronger (30%) hydrogen peroxide solution (Examples 3 and 4).

SUMMARY OF DISCLOSURE

In summary, the present invention provides a novel chlorine dioxide generating process using hydrogen peroxide as the reducing agent. The hydrogen peroxide preferably is pre-mixed with at least a portion of either one or both of the aqueous chlorate solution and the sulfuric acid or may be diluted. This pre-mixing minimizes or eliminates the possibility of foaming, corrosion, inefficient use of hydrogen peroxide. Modifications are possible within the scope of this invention.

What I claim is:

1. A continuous process for the production of chlorine dioxide, comprising the steps of:

reducing chlorate ions with hydrogen peroxide in an aqueous acid reaction medium having a total acid normality of about 0.1 to about 11N in a reaction zone, maintaining said reaction medium at a boiling point of the reaction medium while a subatmospheric pressure is applied to said reaction zone, maintaining substantially steady state conditions in said reaction zone by continuously feeding into said reaction zone an aqueous chlorate solution, hydrogen peroxide and strong mineral acid in such manner that said hydrogen peroxide is rapidly and uniformly distributed throughout said reaction medium to avoid localized concentrations of hydrogen peroxide, in said reaction medium, pre-mixing the hydrogen peroxide feed to said reaction medium with at least a portion of said aqueous chlorate solution or of said strong mineral acid or mixture thereof in a mixing zone prior to feeding the pre-mixed hydrogen peroxide from said mixing zone into said reaction zone to provide a diluted hydrogen peroxide feed permitting rapid and uniform distribution of hydrogen peroxide in said reaction medium, feeding the pre-mixed hydrogen peroxide to said reaction zone at a rate such that consumption of hydrogen peroxide therein is from about 0.25 to about 0.28 tons of hydrogen peroxide per ton of chlorine dioxide produced, and removing chlorine dioxide, oxygen and steam from said reaction zone.

2. The process of claim 1 wherein said hydrogen peroxide feed is pre-mixed with at least a portion of said aqueous chlorate solution.

3. The process of claim 1 wherein said hydrogen peroxide feed is pre-mixed with at least a portion of said strong mineral acid.

4. The process of claim 1 wherein said mixing zone is a vessel separate from said reaction zone.

5. The process of claim 1 wherein the subatmospheric pressure in said reaction zone is about 50 to about 400 mmHg.

6. The process of claim 5 wherein said subatmospheric pressure is about 100 to about 300 mmHg.

7. The process of claim 6 wherein said subatmospheric pressure is about 120 to about 200 mmHg.

8. The process of claim 1 wherein said reaction medium is maintained at a reaction temperature of at least 50° C.

9. The process of claim 8 wherein said reaction temperature is from about 65° C. to about 80° C.

10. The process of claim 1 wherein said chlorate ions are provided by an alkali metal chlorate.

11. The process of claim 10 wherein said alkali metal chlorate is sodium chlorate.

12. The process of claim 11 wherein said strong mineral acid is sulphuric acid and a sodium sulphate is deposited from said reaction medium in said reaction zone.

13. The process of claim 12 wherein said total acid normality is from 5 to 11N, said sodium sulphate is deposited in a form of a sodium acid sulphate, said sodium acid sulphate is removed from the reaction zone and is subjected to a metathesis reaction to form neutral sodium sulphate and an aqueous acid medium.

14. The process of claim 1 wherein said chlorate ions and acidity for the reaction medium are provided by chloric acid.

15. The process of claim 14 wherein the chloric acid normality is from about 0.5 to about 5N.

16. The process of claim 14 wherein said reduction of chlorate ions with hydrogen peroxide is carried out in the presence of a dead load of sodium chlorate.

17. The process of claim 1 wherein said total acid normality is about 2 to about 5N.

18. The process of claim 1 wherein said total acid normality is about 5 to about 11N.

19. The process of claim 1 wherein a production rate-enhancing catalytic species is present in the reaction medium.

20. The process of claim 19 wherein said catalytic species is Ag, Mn, V, Mo, Pd or Pt.

21. The process of claim 1 wherein said chlorate ions and said hydrogen peroxide are fed to said reaction zone in sufficient quantities that a molar ratio of $H_2O_2$:$ClO^-_3$ in the feed is no more than about 1:2.

22. The process of claim 21 wherein said total acid normality is less than about 5 normal and said chlorate ions and said hydrogen peroxide are fed to said reaction zone in sufficient quantities that a chlorate ion concentration in said reaction medium is at least about 2M.

23. The process of claim 22 wherein said chlorate ion concentration is about 3M to about 4M.

24. The process of claim 21 wherein said total acid normality is greater than about 5N and said chlorate ions and said hydrogen peroxide are fed to said reaction zone in sufficient quantities that a chlorate ion concentration in said reaction medium is at least about 0.2M.

25. The process of claim 1 wherein said strong mineral acid is hydrochloric acid.

26. The process of claim 1 wherein said strong mineral acid comprises a mixture of at least two strong mineral acids selected from the group consisting of sulfuric acid, chloric acid, hydrochloric acid, perchloric acid and nitric acid.

* * * * *